(12) United States Patent
Li (10) Patent No.: US 10,908,779 B2
(45) Date of Patent: Feb. 2, 2021

(54) SELECTIVE DISPLAY OF CHAT ROOM CONTENTS

(71) Applicants:Atlassian Pty Ltd, Sydney (AU); Atlassian, Inc., San Francisco, CA (US)

(72) Inventor: Shuai Li, Sunnyvale, CA (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 16/271,610

(22) Filed: Feb. 8, 2019

(65) Prior Publication Data

US 2020/0104015 A1 Apr. 2, 2020

Related U.S. Application Data

(60) Provisional application No. 62/737,804, filed on Sep. 27, 2018.

(51) Int. Cl.
*G06F 3/048* (2013.01)
*G06F 3/0482* (2013.01)
*H04L 12/58* (2006.01)

(52) U.S. Cl.
CPC ............ *G06F 3/0482* (2013.01); *H04L 51/04* (2013.01); *H04L 51/12* (2013.01); *H04L 51/16* (2013.01)

(58) Field of Classification Search
CPC ... G06Q 50/01; G06Q 10/101; H04N 21/4788
See application file for complete search history.

(56) References Cited

U.S. PATENT DOCUMENTS

| | | | | |
|---|---|---|---|---|
| 9,497,267 | B1* | 11/2016 | Hoarau | H04L 67/42 |
| 10,374,985 | B2* | 8/2019 | Kim | H04L 12/1822 |
| 10,389,662 | B2* | 8/2019 | Chudge | H04L 51/04 |
| 2007/0255791 | A1* | 11/2007 | Bodlaender | H04L 12/1822 709/206 |
| 2009/0319356 | A1* | 12/2009 | Spitzer | G06Q 20/1235 705/14.25 |
| 2010/0228777 | A1* | 9/2010 | Imig | G06F 16/335 707/772 |
| 2011/0022450 | A1* | 1/2011 | Meredith | G06Q 30/0241 705/14.4 |
| 2011/0087745 | A1* | 4/2011 | O'Sullivan | G06Q 10/10 709/206 |
| 2013/0014035 | A1* | 1/2013 | Won | H04L 12/1822 715/758 |
| 2013/0218987 | A1* | 8/2013 | Chudge | H04L 67/22 709/206 |
| 2013/0246525 | A1* | 9/2013 | Patil | G06Q 10/107 709/204 |

(Continued)

*Primary Examiner* — Linh K Pham
(74) *Attorney, Agent, or Firm* — Brownstein Hyatt Farber Schreck, LLP (57) ABSTRACT

A collaborative information management program is provided, which supports interaction by an account with a plurality of chat rooms. The program is configured to establish or define a meta-room that aggregates content posted to a set of chat rooms of the plurality of chat rooms. The program provides instructions to display user interfaces that provide user functionality to view content in the meta-room and access chat rooms to interact therewith.

18 Claims, 6 Drawing Sheets

(56) References Cited

U.S. PATENT DOCUMENTS

| | | | | |
|---|---|---|---|---|
| 2014/0040404 A1* | 2/2014 | Pujare | ............... | H04L 51/04 |
| | | | | 709/206 |
| 2014/0236953 A1* | 8/2014 | Rapaport | ............... | G06Q 10/10 |
| | | | | 707/740 |
| 2014/0365924 A1* | 12/2014 | Han | ............... | G06F 3/04842 |
| | | | | 715/758 |
| 2015/0256570 A1* | 9/2015 | Joon | ............... | H04L 12/1813 |
| | | | | 370/261 |
| 2016/0191578 A1* | 6/2016 | Kim | ............... | H04L 51/04 |
| | | | | 709/204 |
| 2016/0352677 A1* | 12/2016 | Gordon | ............... | H04L 12/1818 |
| 2020/0052921 A1* | 2/2020 | van Rensburg | ............... | H04L 51/04 |

* cited by examiner

SELECTIVE DISPLAY OF CHAT ROOM CONTENTS

BENEFIT CLAIM

This application claims the benefit under 35 U.S.C. § 119(e) of provisional application 62/737,804, filed Sep. 27, 2018, the entire contents of which is hereby incorporated by reference for all purposes as if fully set forth herein.

TECHNICAL FIELD

The present disclosure relates to collaborative information management systems, programs, methods, and instructions that provide electronic messaging functions, for instance, applications that support interactive live conversations among a plurality of different accounts or computing devices within organized data structures and presentation systems often referred to as chat rooms. The present disclosure also relates to enhanced user interfaces that summarize and present useful information from interactive conversations on computing devices in order to facilitate efficient, accurate, and engaged interaction by a user.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by their inclusion in this section.

Online chat communication systems facilitate fast transmission of electronic messages to multiple user accounts of recipients, that is, users who are provided access to a particular chat room. Some chat room message management systems provide other team communication functions and can act as a discussion medium as well as a container of information that a team can consult, search, and review at a later time. These systems can distribute messages almost as fast as users can type messages on a keyboard or speak to a voice recognition unit, and consequently they are often termed real-time chat rooms.

As users of chat rooms become connected, both socially and professionally, to ever larger groups of other users, the number of chat rooms per user is also increasing. For instance, a given user may create or otherwise join a separate chat room for each of a group of friends, work colleagues, family, classmates, and other social groups, and additional chat rooms may divide these groups into a multitude of sub-groups based on group members, discussion topics, and/or any other characteristic. As a result, a user may have access to dozens or even upwards of a hundred or more different chat rooms, and the traffic levels or frequency of new posts can vary widely between different chat rooms over time.

It becomes cumbersome and too time-consuming for such a user to monitor all of these different chat rooms for new, interesting, and/or otherwise relevant messages or posts. In computing environments, such as on a smartphone with a relatively small screen, monitoring chat rooms may also require scrolling through multiple pages or screens that list the chat rooms, or may otherwise require entering search terms to identify one or more desired chat rooms. The user typically must then select a desired chat room to access the room and view a history of old and possibly new messages. Such an experience can be discouraging to users, and may result in users wasting time accessing and viewing content that is not entirely relevant. Users may even lose interest and stop interacting with chat rooms actively, meaning that they are at risk of missing important information. Accordingly, there is a desire to provide enhanced message management systems and/or user interfaces that help to alleviate one or more of the above-noted challenges.

BRIEF DESCRIPTION OF THE DRAWINGS

The embodiments of the disclosure will be understood and appreciated more fully from the following detailed description, taken in conjunction with the drawings in which.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure.

General Overview

The present disclosure provides techniques for organizing and presenting chat room content and information and enhancing user interaction therewith. In an embodiment, a computer system executes instructions to implement a collaborative information management program or system. The management system causes the display of a user interface for interacting with chat rooms accessible to a user. The displayed user interface includes a meta-room, which aggregates content posted to multiple chat rooms. In one example, the aggregated content includes just new messages posted to any of the multiple chat rooms. The aggregated content may further be filtered to include particular messages, for instance, only those new messages that include one or more specified terms and/or other content.

In one embodiment, the management system is configured to receive user input through the user interface, and the system utilizes the user input to define one or more meta-rooms that are displayed or otherwise accessible through the user interface. For instance, the user interface may provide a form that allows the user to input a name for the new meta-room, specify which chat rooms to include as part of the meta-room, and/or populate a filter for further narrowing the content provided in the meta-room. In one example, the user specifies which chat rooms to include as part of the meta-room by providing one or more search terms, which the system uses to identify chat rooms with at least partially matching room names. The user may populate the filter with additional terms or other content items, such as a file or Internet link, image, video, and audio file, which the system uses to narrow the content provided in the meta-room to that content that includes such additional terms or other content items.

In another example, the management system is configured to define and generate one or more meta-rooms without direct user interaction. Although, the system may also be configured to provide proposed meta-rooms, which the user can select for inclusion in the user interface. The system may, for instance, define and generate a default meta-room that aggregates all new content posted to any chat room accessible to the user. The system may also generate other meta-rooms based on one or more factors. These factors may include similar characteristics with user-defined meta-rooms, the inclusion of certain key words in meta room names or posted content, such as "urgent," "important," "ASAP," the user's name or chat room handle, among other factors.

Further, the management system is configured to receive user input through the user interface to select a particular meta-room. Response to receiving the user input to select a particular meta-room, the user interface displays the content posted to the corresponding chat rooms. A given meta room with newly posted content may be highlighted or otherwise formatted to visibly notify the user of such newly posted content. In the present embodiment, the meta-room includes only new content posted to the corresponding chat rooms, as well as, identifying information related to the new content, for instance, the identity of the user that posted the new content and the chat room to which the content was posted. The user interface is further configured to receive user input through the meta-room to select a desired content entry. In response to receiving the user input to select a content entry in the meta-room, the user interface displays the chat room corresponding to the selected content entry. This displayed chat room includes additional old, saved, or otherwise not-deleted content, which helps to provide useful context to the content posted in the meta-room. The user may then provide a response or otherwise interact through the displayed chat room. In one embodiment, the user may also provide a response or otherwise interact through the content displayed in the meta-room.

In an embodiment, a computer-implemented method comprises executing, by a computer system, instructions to implement a collaborative information management program that supports interaction by an account with a plurality of chat rooms; establishing, by the computer system and for the account, a meta-room that aggregates content posted to a set of chat rooms of the plurality of chat rooms; providing, by the computer system, instructions to display a first user interface, wherein the first user interface includes a first element for the meta-room, wherein the first element is selectable to initiate display of the meta-room; receiving, by the computer system, a first request that corresponds to a selection of the first element; in response to receiving the first request, providing instructions to display a second user interface for the meta-room, wherein the second user interface includes one or more second elements corresponding to aggregated content from the set of chat rooms, wherein each of the one or more second elements is selectable to initiate display of a chat room, of the set of chat rooms, associated with corresponding aggregated content; receiving, by the computer system, a second request that corresponds to a selection of a given second element of the one or more second elements; in response to receiving the second request, providing instructions to display a third user interface for a chat room associated with the given second element and the corresponding aggregated content.

In another embodiment, a computer-implemented method comprises executing, by a computer system, instructions to implement a message management program that supports interaction by an account with a plurality of chat rooms; receiving, by the computer system, a first command to define a meta-room that aggregates content from a set of chat rooms of the plurality of chat rooms; in response to receiving the first command, providing instructions to display a first user interface, wherein the first user interface includes an input panel configured to receive information to identify the set of chat rooms; in response to receiving, via the input panel, information to identify the set of chat rooms, defining the meta-room to selectively include new content from the set of chat rooms; providing, by the computer system, instructions to display a second user interface, wherein the second user interface includes a first element for the meta-room, and wherein the first element is selectable to initiate display of the meta-room; receiving, by the computer system, a second command that corresponds to a selection of the first element; in response to receiving the second command, providing instructions to display a third user interface for the meta-room, wherein the third user interface includes one or more second elements corresponding to the new content from the set of chat rooms.

Other embodiments, features and aspects will become apparent from the disclosure as a whole.

Structural and Functional Overview

Figure 1:
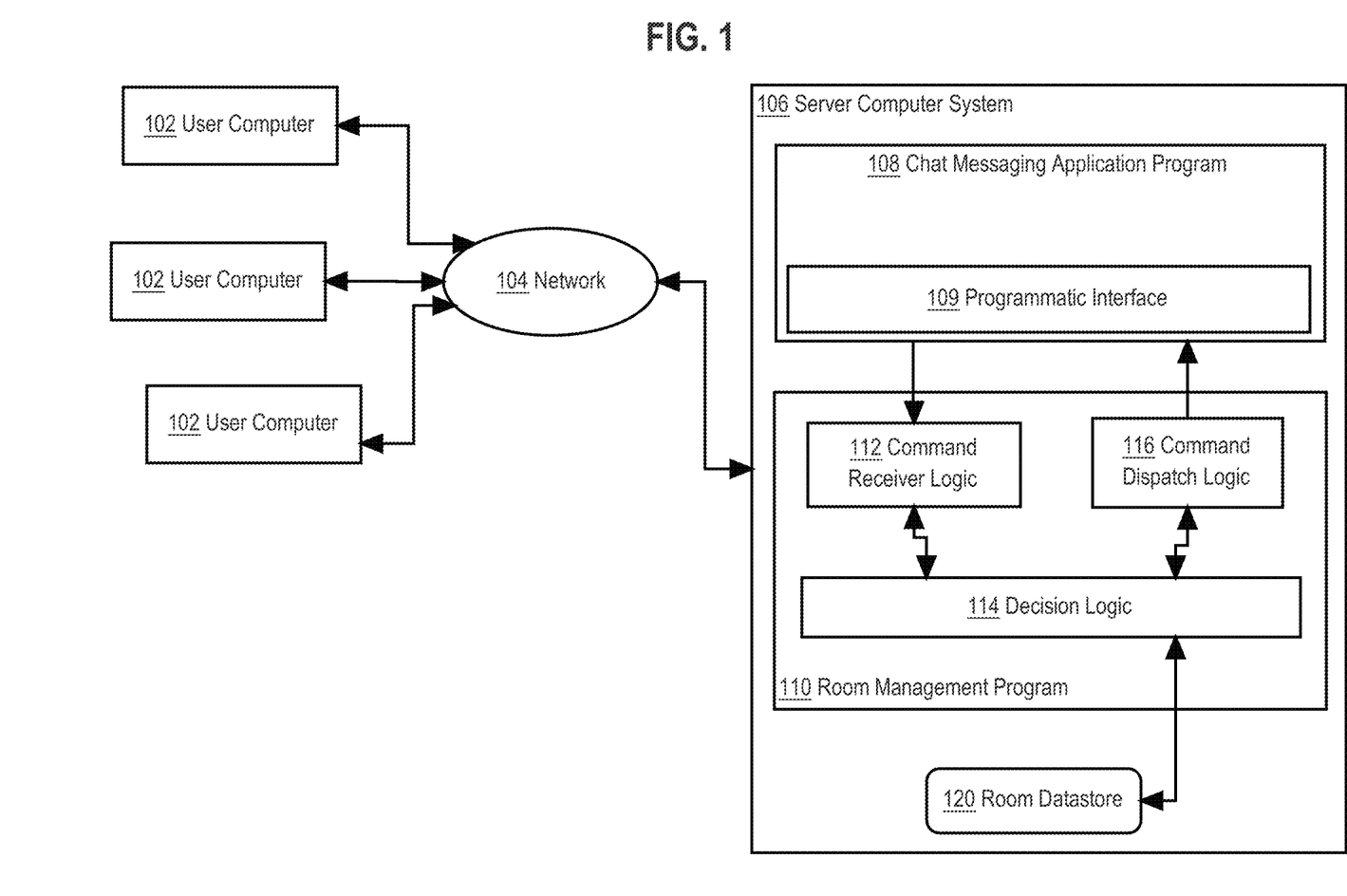
FIG. 1 illustrates a computer system that may be used to implement an embodiment.

FIG. 1 illustrates a computer system that may be used to implement an embodiment of a chat room management system.

In the example of FIG. 1, a plurality of user computers 102 are coupled via network 104 to a server computer system 106. Any number of user computers or client devices 102 may be used and three (3) are shown in FIG. 1 merely for purposes of providing an illustrative example. Each user computer 102 may comprise a mobile computing device, desktop computer, laptop computer or other end station. Each user computer 102 is capable of receiving input via a keyboard, pointing device or other input-output device, has a visual data display device, and one or more network interfaces that are capable of communication with network 104. In one embodiment, each user computer 102 executes at least an operating system and a web browser application program that is capable of receiving, rendering and causing display of pages based upon structured markup language code or instructions in HTML, XML or similar languages. The installation of application-specific client software on a user computer 102 is not required and an embodiment may use a browser to communicate with a compatible HTTP server at the server computer 106.

The network 104 broadly represents any combination of one or more local area networks, wide area networks, campus networks and/or internetworks. Packet-switched networks may be used with networking infrastructure devices such as switches and routers that are programmed to communicate packet data based on internet protocol (IP), a transport protocol such as TCP or UDP, and higher-order protocols at any of several different logical layers, such as those defined by the Open Systems Interconnect (OSI) multi-layer internetworking model.

Server computer system 106 may comprise one or more cores, processors, computers, and/or virtual machine instances hosted on the premises of an enterprise or using a public or private cloud computing facility.

In an embodiment, server computer system 106 hosts or executes a chat messaging application program 108, which is illustrated as a single functional element in FIG. 1 but may be organized using a plurality of different computer programs, processes or other software elements. The chat messaging application program 108 is a computer-executed system that manages a plurality of different, named data tables, termed chat rooms. Each chat room may have a unique identifier, handle, or name, which commonly helps to identify a characteristic of users that are granted access to the room and/or the subject matter or topics relevant to the room.

The chat messaging application program 108 is programmed or configured to process functions for the creation and management of a plurality of different user accounts, consisting of a set of user credentials that may be used to access the system using one of the user computers 102. Each user account comprises a record in a datastore that associates a unique handle, identifier or name; a screen name or display name; credentials such as an e-mail address and password; and other metadata relating to an account. Typically handles or account identifiers are denoted by a character tag such as "@" and the use of a handle in a chat room message or posting implies that the corresponding account is being addressed. An example of a handle is @jameskirk with a corresponding screen name or display name of "James Kirk".

The chat messaging application program 108 is programmed for receiving messages, typically short messages consisting of text and links or other media attachments and transmitting those messages only to user accounts that are then-currently associated with a specified particular chat room, via the credentials of the user account. A particular user account may access any number of different chat rooms subject to permissions or other security credentials created and enforced by an administrative user of each of the chat rooms. In one embodiment, chat messaging application program 108 is the STRIDE cloud-based team business communication and collaboration tool, commercially available from Atlassian Pty Ltd., Sydney, Australia and described at the time of this writing at the domain STRIDE.COM via the World Wide Web. Other embodiments may use or integrate with some other chat messaging application program, for instance, SLACK which is another cloud-based communication and collaboration tool, commercially available from Slack Technologies, San Francisco, Calif. and described at the time of this writing at the domain SLACK.COM via the World Wide Web.

In an embodiment, the chat messaging application program 108 is communicatively coupled using a programmatic interface 109 to a room management program 110 having command receiver logic 112, decision logic 114, command dispatch logic 116, and a room datastore 120. Other embodiments may use different internal organizational arrangements to implement functionally equivalent computer operations. In an embodiment, programmatic interface 109 comprises executable code that is responsive to calls from command dispatch logic 116, the calls defined using an application programming interface (API). In an embodiment, programmatic interface 109 comprises executable code that is capable of transmitting notifications about chat room messages to the command receiver logic 112.

In some embodiments, the command receiver logic 112 is programmed to receive commands or instructions to define meta-rooms, such as a meta-room name or identifier, data regarding source chat rooms to include in the meta-room, and/or filter information for further narrowing content from the source chat rooms provided in the meta-room.

In an embodiment, decision logic 114 is programmed to evaluate commands or instructions that have been obtained through the command receiver logic 112 to create requested meta-rooms and to determine what content, announcements, messages, or other transmissions to post in the meta-room of the chat messaging application program 108. In an embodiment, command dispatch logic 116 is programmed to receive the content, announcements, messages, or other transmissions to post in the corresponding meta-room.

In other embodiments, one or more of the user computers 102 are configured to include one or more of components 108, 109, 110, 112, 114, 116, 120 of the server computer system 106, or are otherwise configured to perform corresponding functionality.

Example Implementation of Meta-Rooms

Figure 2:
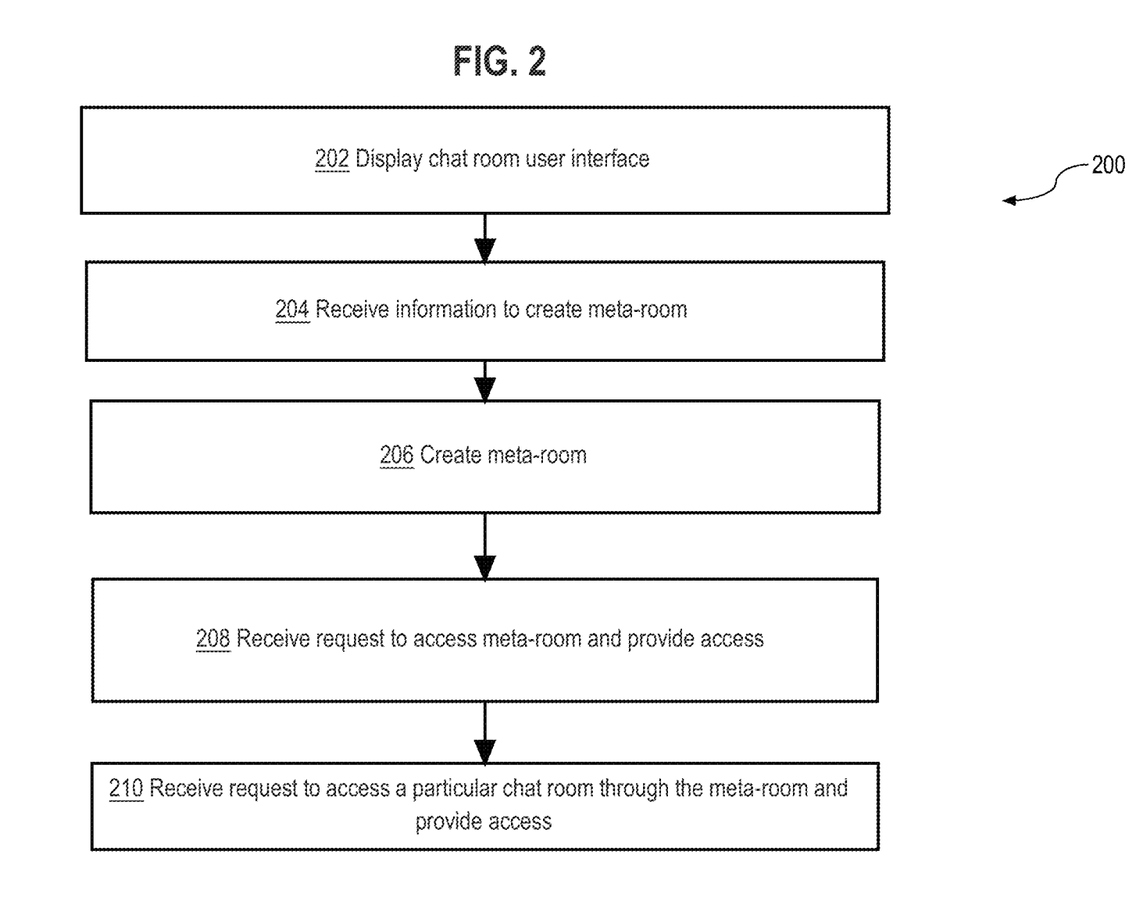
FIG. 2 illustrates a method that may govern the operation of a chat room management system, in one embodiment.

FIG. 2 illustrates a method that may govern the operation of a chat room management program or system, in one embodiment. In the embodiment of FIG. 2, an example method 200 may be performed to cause the display of an enhanced user interface that aggregates content in a meta-room, which facilitates efficient, accurate, and useful interaction with multiple chat rooms. Method 200 includes operations, functions, and/or actions as illustrated by blocks 202-210, and which may be implemented by the computer system of FIG. 1. Room management program 110 and other programmed functional elements of FIG. 1 may implement all or parts of the process steps of FIG. 2.

For purposes of illustrating a clear example, the method of FIG. 2 is described herein with reference to execution using certain elements of FIG. 1; however, FIG. 2 may be implemented in other embodiments using computing devices, programs or other computing elements different than those of FIG. 1. Further, although blocks 202-210 are illustrated in order, the blocks may also be performed in parallel, and/or in a different order than described herein. Method 200 may also include additional or fewer blocks, as needed or desired. For example, blocks 202-210 can be combined into fewer blocks, divided into additional blocks, and/or removed based upon a desired implementation.

FIG. 2 may be implemented using one or more computer programs or other software elements organized as sequences of instructions stored on computer-readable storage media. FIG. 2, and each other flow diagram or other process description in this disclosure, is described at the same level of detail as ordinarily used by persons of skill in the computing arts to communicate among one another about the functional steps to be realized in computer programs that may include far more methods, objects, subroutines, or instructions than specifically indicated in FIG. 2; the development, deployment, testing and debugging of functional programs is deemed to be within the high level of skill in the art to which this disclosure pertains.

In addition, each block 202-210 may represent a module, a segment, or a portion of program code that includes one or more instructions executable by a processor for implementing specific logical functions or operations. The program code may be stored on any type of computer-readable medium or storage device including a disk or hard drive, for example. The computer-readable medium may include a non-transitory computer-readable medium, such as computer-readable media that stores data for short periods of time like register memory, processor cache, and Random Access Memory (RAM). The computer-readable medium may also include non-transitory media, such as secondary or persistent long term storage, like read only memory (ROM), optical or magnetic disks, compact-disc read only memory (CD-ROM), etc. The computer-readable medium may also include any other volatile or non-volatile storage systems. The computer-readable medium may be considered a computer-readable storage medium, for example, or a tangible storage device. In addition, one or more of blocks 202-210 may represent circuitry that is configured to perform the logical functions and operations of method 200.

At block 202, a user computer or client device 102 displays a chat room graphical user interface. The user computer 102 may generate and display the user interface by locally rendering information and instructions provided over a network by the server computer system 106.

Figure 3:
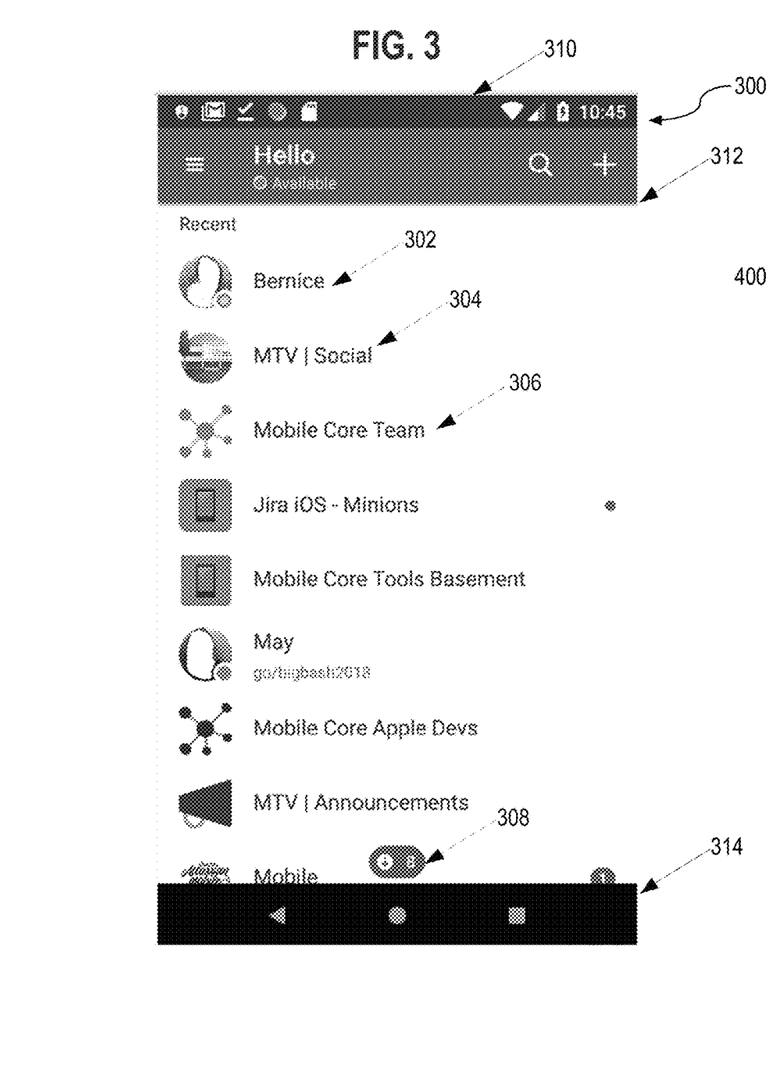
FIG. 3 illustrates an example graphical user interface that may be generated by a chat room management system.

FIG. 3 illustrates an example graphical user interface 300. In various embodiments, room management program 110 or other elements of server computer system 106 (FIG. 1), may be configured to generate instructions for the user interface 300 and cause the user computer to display the user interface on the user computer. Thus, a chat room system may be implemented as a server-side application such as chat messaging application program 108 that communicates using an app protocol over HTTP to a mobile computing device such as user computers 102 that is executing a chat app programmed to receive and interpret instructions in the app protocol. Or, the user computer 102 may execute a conventional browser and interpret dynamically generated HTML that implements the chat room system using software as a server (SaaS) techniques.

In the example user interface 300, various identifiers 302, 304, 306 of available, previously defined chat rooms are shown, including chat rooms labeled named Bernice, MTV Social, Mobile Core Team, Jira iOS—Minions, Mobile Core Tools Basement, May, Mobile Core Apple Devs, MTV Announcements, and Mobile. Additional chat rooms may also be accessible by the user for which labels or names do not fit on the current screen of the user interface 300. In FIG. 3, the client device may have a limited screen size, such as with a smartphone, and additional chat rooms do not fit on the current screen but can be scrolled down to using touch gestures in a touchscreen interface that is displaying the user interface 300; for example, a scroll widget 308 may comprise a graphical indication that a specified number of other chat room labels are available via scrolling downward. Generally, a user selects a particular chat room on the user interface 300 to open the chat room and view content posted to the particular chat room by tapping on a name or label of the room. User interface 300 may further comprise graphical, touch-sensitive selectable toolbars 310, 312, 314 for selecting utility functions or control functions.

At block 204, information is received to create a meta-room. In this context, a meta-room may be a chat room which aggregates useful content from multiple chat rooms, such as relevant and/or new content from the chat rooms. Generally, new content is content from the chat rooms that has not previously been displayed or viewed on the client device. The meta-room may be experienced with the user computer 102 as a named element or entry of the user interface 300 which, when selected, causes displaying all aggregated chat room messages that are associated with the meta-room. Creating a meta-room may occur via invocation of a mobile app function via selecting an icon, keyword, command or option, as further described herein for FIG. 4. In one embodiment, in response to receiving such an invocation, the user computer 102 displays an input panel that is programmed to receive the information to create the meta-room, which may comprise a meta-room name, source, and filter as further described for FIG. 4. The input panel may be displayed under control of a mobile app executing in the user computer or may form part of dynamically generated HTML that the server computer creates and transmits to the user computer. Room management program 110 may implement this functionality.

At block 206, in an embodiment, room management program 110 creates the meta-room in accordance with the received information. Creating a meta-room may comprise creating, in a database managed by the chat room management system, a streaming query or continuous query characterized by a plurality of filter attributes and operations which when executed using a database engine cause returning a continuous stream of result sets for chat room messages that match the meta-room. The server computer may be programmed to derive and form the filter attributes and operations for a meta-room query from the information to create the meta-room, including the name, source, and filter values. In one embodiment, the name is used to create a named query, and the source and filter values are used to generate a query in Structured Query Language (SQL) or a similar query language which when executed causes returning a continuous stream of result sets for chat rooms that match the query. The client device may then receive commands or other instructions to select, for inclusion in the meta-room, one or more chat rooms from the results sets.

At block 208, room management program 110 receives a request to access a meta-room, and in response, displays content aggregated in the meta-room. For example, block 208 may comprise receiving a tap or gesture, in a touch-sensitive display of the user computer 102, on a name of a meta-room that is displayed in a list of available meta-rooms. In response, the mobile app executing in the user computer 102 causes displaying chat room messages that are associated with the specified meta-room. The chat room messages to be displayed may be obtained by the mobile app transmitting a request to the server computer using an app-specific protocol, or by invoking an API function exposed by the server computer. In response, the server computer 106 executes the search query that was created for the meta-room, obtains a result set of relevant chat room messages, and transmits the result set to the mobile app or user computer 102 for display. In an embodiment, within a display of a meta-room, each chat room message is displayed with a name of the original or native chat room from which it has been aggregated into the meta-room. In an embodiment, each such name is displayed as an active, selectable hyperlink which, when selected, invokes block 210.

Figure 6:
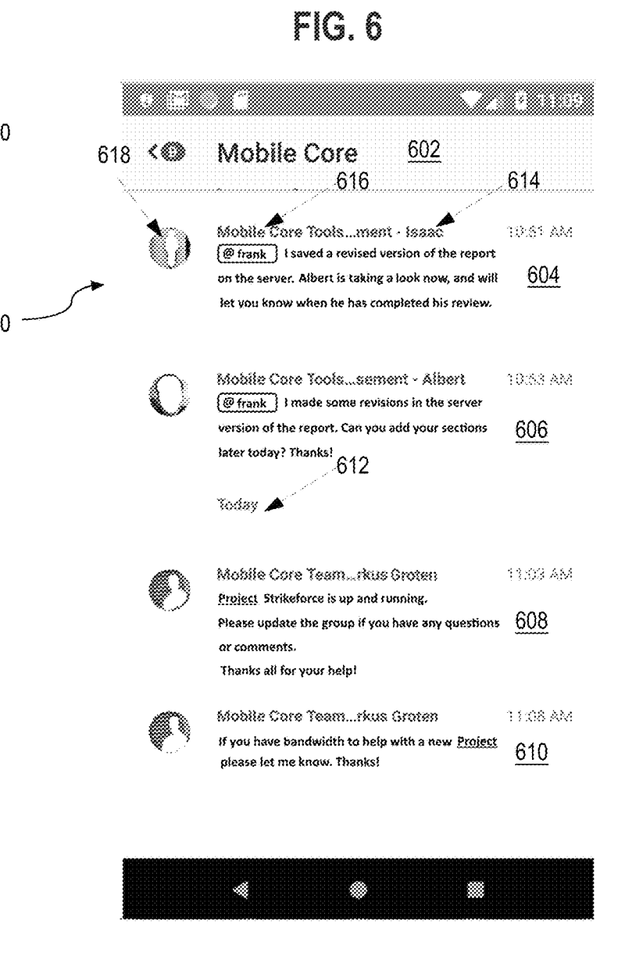
FIG. 6 illustrates yet another example graphical user interface that may be generated by a chat room management system.

At block 210, the room management program 110 receives a request to access a particular chat room through the content in the meta-room, and in response, displays content in the particular chat room. For example, block 208 may comprise receiving a tap or gesture, in a touch-sensitive display of the user computer 102, on a particular chat room message or a name of an original or native chat room, while viewing a plurality of messages for a meta-room, for example as seen in FIG. 6. In response, the mobile app executing in the user computer 102 causes displaying a plurality of other chat room messages that are associated with the particular chat room that is associated with the specified message. The chat room messages to be displayed may be obtained by the mobile app transmitting a request to the server computer 106 using an app-specific protocol, or by invoking an API function exposed by the server computer. In response, the server computer 106 executes the search query that was created for the chat-room, obtains a result set of relevant chat room messages, and transmits the result set to the mobile app or user computer 102 for display, as seen for example in FIG. 7.

Figure 4:
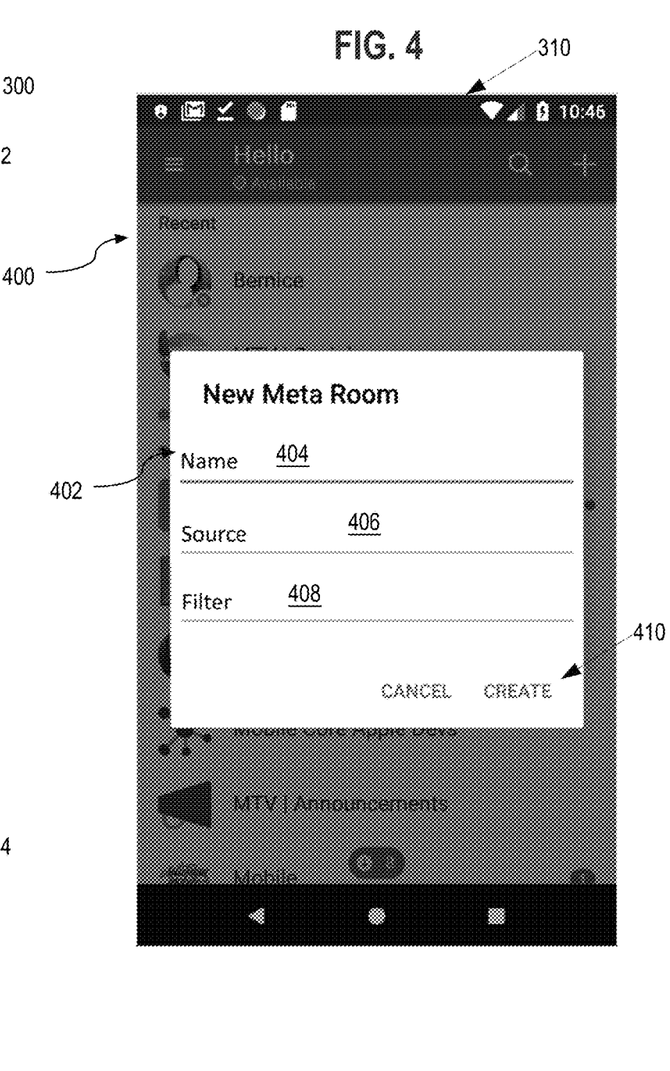
FIG. 4 illustrates another example graphical user interface that may be generated by a chat room management system.

FIG. 4 illustrates another example graphical user interface that may be generated by room management program 110 or other elements of a chat room management system. In FIG. 4, a graphical user interface 400 includes a meta-room interface 402 that includes a "Name" field 404, a "Source" field 406, and a "Filter" field 408 for the purpose of receiving information to create a meta-room. The Name field 404 is programmed to receive a name for the new meta-room. The Source field 406 is programmed to receive data to search for or otherwise identify chat rooms that will be associated with the meta-room. The Filter field 408 is programmed to receive filter characteristics for further narrowing the content from the source chat rooms that will be included in the meta-room. In some embodiments, filter characteristics are specified as regular expressions or SQL syntax statements. After entering data in fields 404, 406, 408, a new meta-room may be created by input to a Create control 410 in GUI 400.

Figure 5:
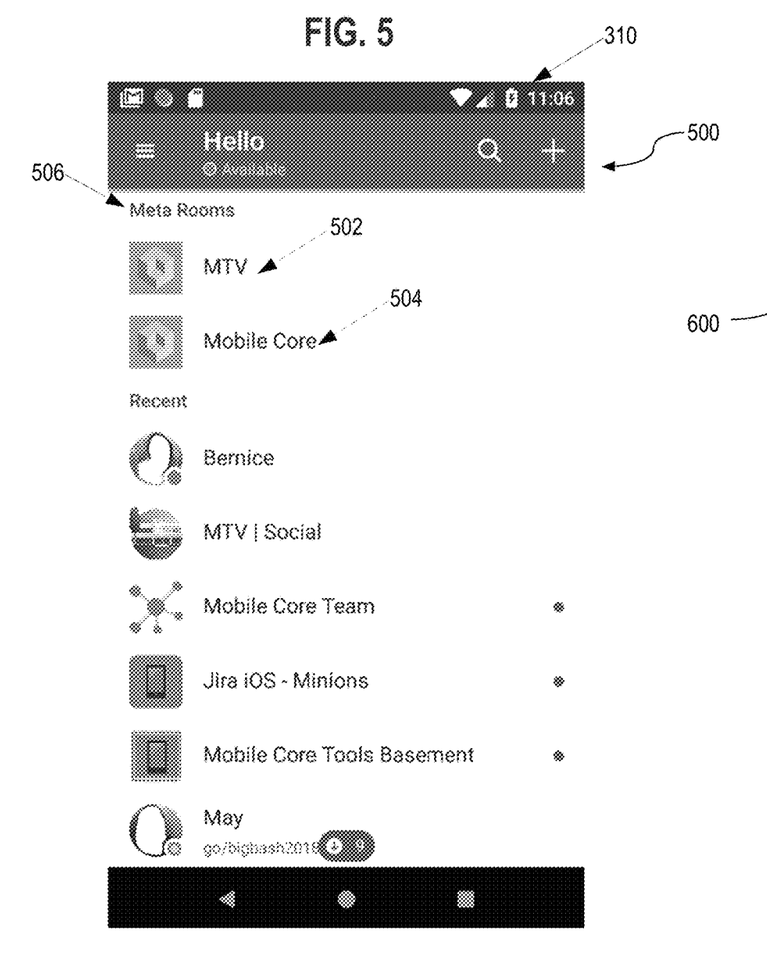
FIG. 5 illustrates a further example graphical user interface that may be generated by a chat room management system.

FIG. 5 illustrates a further example graphical user interface that may be generated by room management program 110 or other elements of a chat room management system. In FIG. 5, as indicated by a meta-room group label 506, a graphical user interface 500 includes meta-rooms having labels "MTV" 502 and "Mobile Core" 504, which were created in accordance with information received at block 204. At one instance of block 204, input "MTV" is received in the Name field 404, and input "MTV" is received in the Source field 406. In response to entering MTV in the Source field 406, the room management program 110 or other elements of chat room management system under program control identified two (2) corresponding chat rooms MTV Social and MTV Announcements. In one embodiment, the room management program 110 requests confirmation from the user computer 102 to include the corresponding chat rooms in the MTV meta-room. Other search terms can be received as input in the Source field to identify and include any other chat rooms in the corresponding MTV meta-room.

At another instance of block 204, the user computer 102 transmits "Mobile Core" as input to the Name field, and the user computer 102 provides "Mobile Core" as input to the Source field. In response to receiving transmission of Mobile Core in the Source field, room management program 110 identified corresponding chat rooms Mobile Core Team and Mobile Core Tools Basement. In some embodiments, the room management program 110 may request confirmation from the user computer 102 to include the corresponding chat rooms in the Mobile Core meta-room. The user computer 102 can provide other search terms in the Source field to identify and include any other chat rooms in the corresponding Mobile Core meta-room. In creating the Mobile Core meta-room, the user computer 102 also provided example filter terms "@frank" to identify messages addressed specifically to the user Frank, and "Project" to help identify particularly relevant, work-related content.

In FIG. 5, the user interface elements for the meta-rooms are displayed with other elements corresponding to other chat rooms, but the meta-room elements have a different visible format so as to be distinguishable from the other elements. For instance, the meta-room elements or entries may be listed at the top of a list and be positioned under a heading (e.g., "Meta Rooms". The meta-room elements may also be highlighted or otherwise indicate when new aggregated content is available.

FIG. 6 illustrates another example graphical user interface that may be generated by room management program 110 or other elements of a chat room management system. In FIG. 6, responsive to a request from a user computer 102 to access the Mobile Core meta-room, the room management program 110 provides access and displays a graphical user interface 600 of the selected meta-room and generates an updated information bar 602 with a label identifying the meta-room. The user interface 600 includes new content items 604, 606, 608, 610 that have been aggregated from the chat rooms Mobile Core Team and Mobile Core Tools Basement. The content items 604, 606, 608, 610 are shown in chronological order, but may be sorted according to other criteria, as desired. In an embodiment, various content items 604, 606, 608, 610 may be separated by divider text 612 indicating a chronological label for the content items; in the example of FIG. 6, content items 604, 606 may have been added yesterday and items 608, 610 were added today. The content items 604, 606, 608, 610 are also shown with source information, such as the user account that posted the content, for example, user accounts labeled Isaac 614, Albert, and Markus Groten, and a label 616 of the chat room in which the content was posted, e.g., Mobile Core Tools Basement or Mobile Core Team. As discussed above, the Mobile Core meta-room, was also narrowed by filter terms "@frank" and "project." FIG. 6 illustrates user interface 600 including only those content items that include these filter terms. In an embodiment, each of the content items 604, 606, 608, 610 comprises a graphical avatar image 618 that may distinctively identify a particular chat room in which the associated content item was originally posted.

Figure 7:
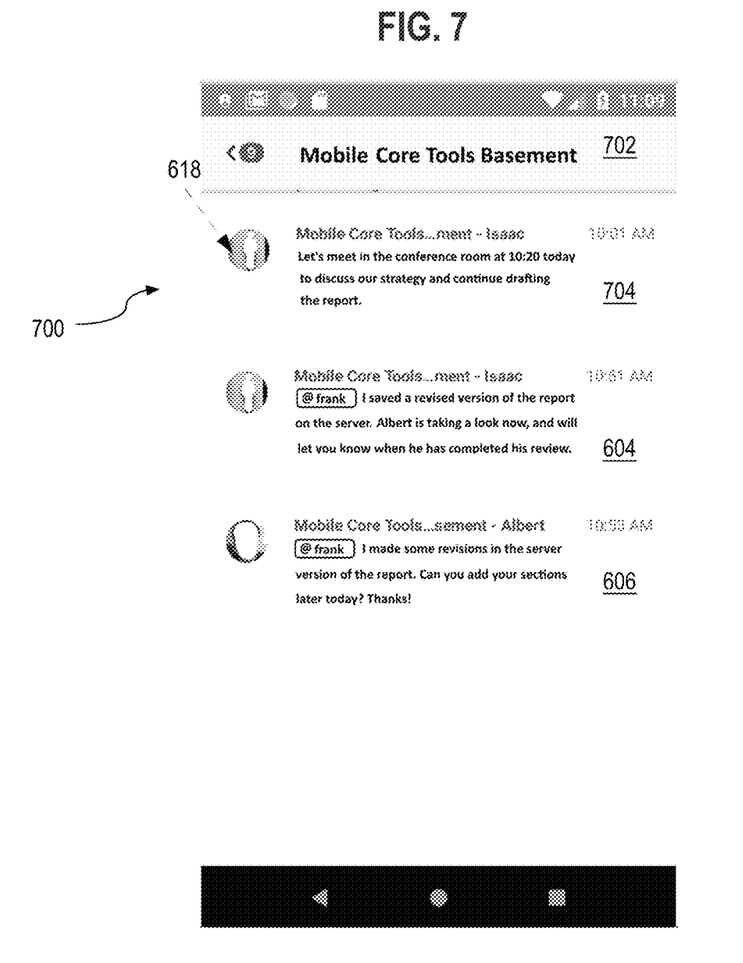
FIG. 7 illustrates an additional example graphical user interface that may be generated by a chat room management system.

FIG. 7 illustrates an additional example graphical user interface that may be generated by room management program 110 or other elements of a chat room management system. In FIG. 7, responsive to a request or command of user computer 102 by selecting a content item associated with the Mobile Core Tools Basement in the meta-room user interface 600, the room management program 110 provides access and displays a graphical user interface 700 of the Mobile Core Tools Basement chat room as indicated by label 702. In the Mobile Core Tools Basement chat room in user interface 700, certain new content items 604, 606 of FIG. 6 are shown, along with content item 704, which is older in time than content items 604, 606. Displaying older content items such as content item 704 is useful to provide additional context and allow a user account or user computer 102 to effectively respond, as desired. The user computer 102 can interact, e.g., post content, in the user interface 700. And, in some embodiments, the user computer 102 can interact directly in the user interface 600.

Using the approaches described herein, monitoring new content across multiple chat rooms in a single or at least a smaller number of meta-rooms is more efficient than in other approaches that require a user account or user computer to select each chat room to view content therein. The ability to also filter new content makes it even more efficient to monitor and view particularly relevant or useful new content. Further, the ability to access a particular chat room through a meta-room display is also more efficient than requiring a user account or user computer to navigate back to a main menu to select and access the particular chat room. As a result, the present disclosure can help to reduce network traffic and retrieve chat room data more efficiently when viewing, filtering, navigating to, and interacting with relevant chat rooms.

Implementation Mechanisms—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 8:
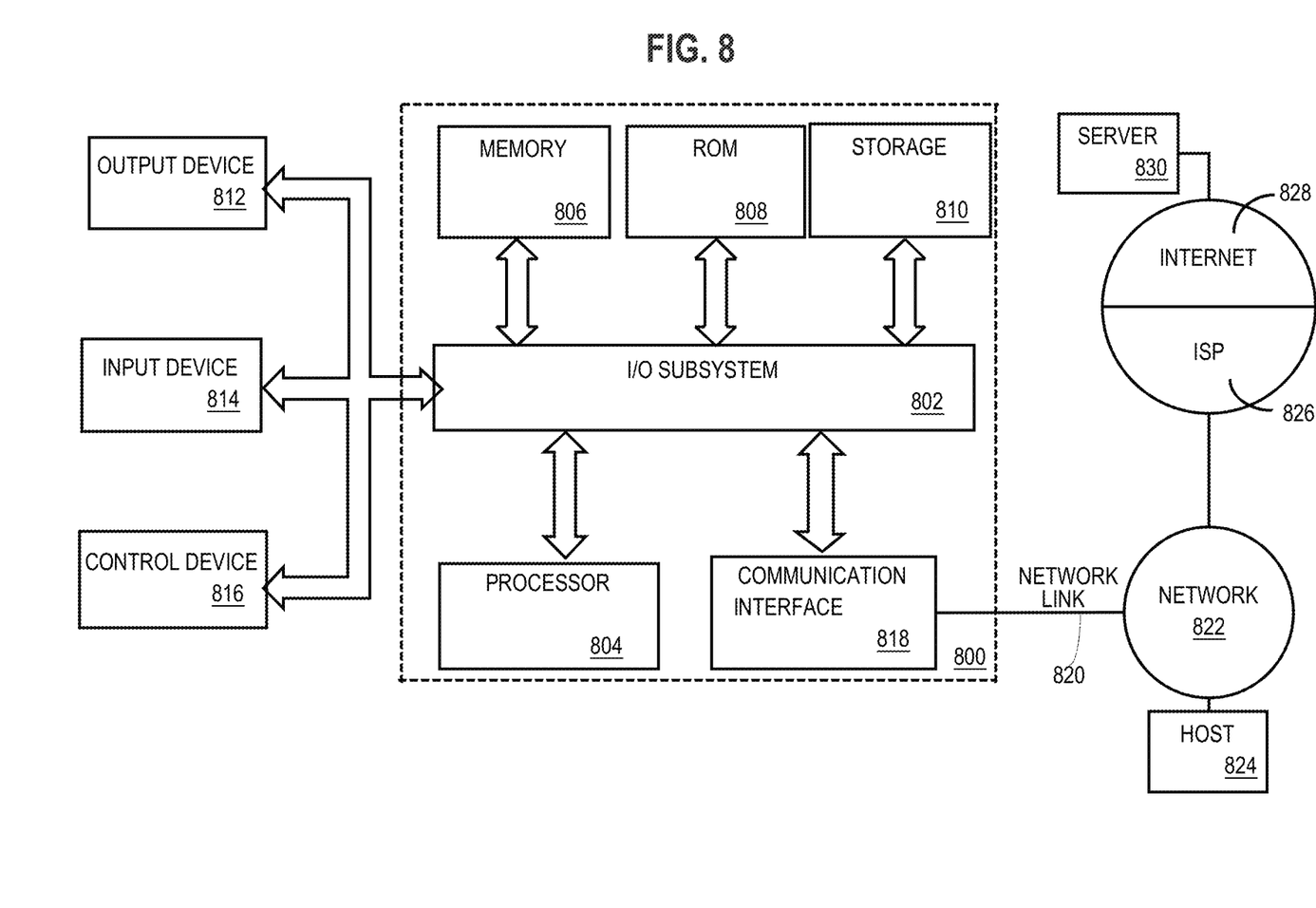
FIG. 8 illustrates an example computer system that may be used to implement aspects of an embodiment.

FIG. 8 is a block diagram that illustrates an example computer system with which an embodiment may be implemented. In the example of FIG. 8, a computer system 800 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 800 includes an input/output (I/O) subsystem 802 which may include a bus and/or other communication mechanism(s) for communicating information and/or instructions between the components of the computer system 800 over electronic signal paths. The I/O subsystem 802 may include an I/O controller, a memory controller and at least one I/O port. The electronic signal paths are represented schematically in the drawings, for example as lines, unidirectional arrows, or bidirectional arrows.

At least one hardware processor 804 is coupled to I/O subsystem 802 for processing information and instructions. Hardware processor 804 may include, for example, a general-purpose microprocessor or microcontroller and/or a special-purpose microprocessor such as an embedded system or a graphics processing unit (GPU) or a digital signal processor or ARM processor. Processor 804 may comprise an integrated arithmetic logic unit (ALU) or may be coupled to a separate ALU.

Computer system 800 includes one or more units of memory 806, such as a main memory, which is coupled to I/O subsystem 802 for electronically digitally storing data and instructions to be executed by processor 804. Memory 806 may include volatile memory such as various forms of random-access memory (RAM) or other dynamic storage device. Memory 806 also may be used for storing temporary variables or other intermediate information during execution of instructions to be executed by processor 804. Such instructions, when stored in non-transitory computer-readable storage media accessible to processor 804, can render computer system 800 into a special-purpose machine that is customized to perform the operations specified in the instructions.

Computer system 800 further includes non-volatile memory such as read only memory (ROM) 808 or other static storage device coupled to I/O subsystem 802 for storing information and instructions for processor 804. The ROM 808 may include various forms of programmable ROM (PROM) such as erasable PROM (EPROM) or electrically erasable PROM (EEPROM). A unit of persistent storage 810 may include various forms of non-volatile RAM (NVRAM), such as FLASH memory, or solid-state storage, magnetic disk or optical disk such as CD-ROM or DVD-ROM and may be coupled to I/O subsystem 802 for storing information and instructions. Storage 810 is an example of a non-transitory computer-readable medium that may be used to store instructions and data which when executed by the processor 804 cause performing computer-implemented methods to execute the techniques herein.

The instructions in memory 806, ROM 808 or storage 810 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 800 may be coupled via I/O subsystem 802 to at least one output device 812. In one embodiment, output device 812 is a digital computer display. Examples of a display that may be used in various embodiments include a touch screen display or a light-emitting diode (LED) display or a liquid crystal display (LCD) or an e-paper display. Computer system 800 may include other type(s) of output devices 812, alternatively or in addition to a display device. Examples of other output devices 812 include printers, ticket printers, plotters, projectors, sound cards or video cards, speakers, buzzers or piezoelectric devices or other audible devices, lamps or LED or LCD indicators, haptic devices, actuators or servos.

At least one input device 814 is coupled to I/O subsystem 802 for communicating signals, data, command selections or gestures to processor 804. Examples of input devices 814 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 816, which may perform cursor control or other automated control functions such as navigation in a graphical interface on a display screen, alternatively or in addition to input functions. Control device 816 may be a touchpad, a mouse, a trackball, or cursor direction keys for communicating direction information and command selections to processor 804 and for controlling cursor movement on display 812. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 814 may include a combination of multiple different input devices, such as a video camera and a depth sensor.

In another embodiment, computer system 800 may comprise an internet of things (IoT) device in which one or more of the output device 812, input device 814, and control device 816 are omitted. Or, in such an embodiment, the input device 814 may comprise one or more cameras, motion detectors, thermometers, microphones, seismic detectors, other sensors or detectors, measurement devices or encoders and the output device 812 may comprise a special-purpose display such as a single-line LED or LCD display, one or more indicators, a display panel, a meter, a valve, a solenoid, an actuator or a servo.

When computer system 800 is a mobile computing device, input device 814 may comprise a global positioning system (GPS) receiver coupled to a GPS module that is capable of triangulating to a plurality of GPS satellites, determining and generating geo-location or position data such as latitude-longitude values for a geophysical location of the computer system 800. Output device 812 may include hardware, software, firmware and interfaces for generating position reporting packets, notifications, pulse or heartbeat signals, or other recurring data transmissions that specify a position of the computer system 800, alone or in combination with other application-specific data, directed toward host 824 or server 830.

Computer system 800 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 800 in response to processor 804 executing at least one sequence of at least one instruction contained in main memory 806. Such instructions may be read into main memory 806 from another storage medium, such as storage 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 810. Volatile media includes dynamic memory, such as memory 806. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 802. Transmission media can also take the form of acoustic or light waves, such as those generated during radio-wave and infra-red data communications.

Various forms of media may be involved in carrying at least one sequence of at least one instruction to processor 804 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 800 can receive the data on the communication link and convert the data to a format that can be read by computer system 800. For instance, a receiver such as a radio frequency antenna or an infrared detector can receive the data carried in a wireless or optical signal and appropriate circuitry can provide the data to I/O subsystem 802 such as place the data on a bus. I/O subsystem 802 carries the data to memory 806, from which processor 804 retrieves and executes the instructions. The instructions received by memory 806 may optionally be stored on storage 810 either before or after execution by processor 804.

Computer system 800 also includes a communication interface 818 coupled to bus 802. Communication interface 818 provides a two-way data communication coupling to network link(s) 820 that are directly or indirectly connected to at least one communication networks, such as a network 822 or a public or private cloud on the Internet. For example, communication interface 818 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 822 broadly represents a local area network (LAN), wide-area network (WAN), campus network, internetwork or any combination thereof. Communication interface 818 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 818 sends and receives electrical, electromagnetic or optical signals over signal paths that carry digital data streams representing various types of information.

Network link 820 typically provides electrical, electromagnetic, or optical data communication directly or through at least one network to other data devices, using, for example, satellite, cellular, Wi-Fi, or BLUETOOTH technology. For example, network link 820 may provide a connection through a network 822 to a host computer 824.

Furthermore, network link 820 may provide a connection through network 822 or to other computing devices via internetworking devices and/or computers that are operated by an Internet Service Provider (ISP) 826. ISP 826 provides data communication services through a world-wide packet data communication network represented as internet 828. A server computer 830 may be coupled to internet 828. Server 830 broadly represents any computer, data center, virtual machine or virtual computing instance with or without a hypervisor, or computer executing a containerized program system such as DOCKER or KUBERNETES. Server 830 may represent an electronic digital service that is implemented using more than one computer or instance and that is accessed and used by transmitting web services requests, uniform resource locator (URL) strings with parameters in HTTP payloads, API calls, app services calls, or other service calls. Computer system 800 and server 830 may form elements of a distributed computing system that includes other computers, a processing cluster, server farm or other organization of computers that cooperate to perform tasks or execute applications or services. Server 830 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 830 may comprise a web application server that hosts a presentation layer, application layer and data storage layer such as a relational database system using structured query language (SQL) or no SQL, an object store, a graph database, a flat file system or other data storage.

Computer system 800 can send messages and receive data and instructions, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage 810, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 804. While each processor 804 or core of the processor executes a single task at a time, computer system 800 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented method comprising:
    executing, by a computer system, instructions to implement a collaborative information management program that supports interaction by an account with a plurality of chat rooms;
    establishing, by the computer system and for the account, a meta-room that aggregates content posted to a set of chat rooms of the plurality of chat rooms, the set of chat rooms including at least a first chat room and a second chat room;
    providing, by the computer system, instructions to display a first user interface, wherein a displayed first user interface includes a first element for the meta-room, wherein the first element is selectable to initiate display of the meta-room;
    receiving, by the computer system, a first request that corresponds to a selection of the first element;
    in response to receiving the first request, providing instructions to display a second user interface for the meta-room, wherein a displayed second user interface includes a plurality of second elements comprising content posted to at least the first chat room and the second chat room, wherein each of the plurality of second elements is selectable to initiate display of a chat room, of the set of chat rooms, corresponding to respective content;
    receiving, by the computer system, a second request that corresponds to a selection of a given second element of the plurality of second elements in the displayed second user interface;
    in response to receiving the second request, providing instructions to display a third user interface for a chat room corresponding to the given second element and respective content; and
    receiving, by the computer system, a filtering command to filter content posted to the set of chat rooms, wherein the meta-room aggregates new content posted to the set of chat rooms and filters the new content based on the filtering command to produce filtered content, which includes the plurality of second elements.

2. The computer-implemented method of claim 1, wherein the meta-room aggregates new content posted to the set of chat rooms, and wherein the plurality of second elements correspond to such new content.

3. The computer-implemented method of claim 1, wherein the filtering command specifies at least one of one or more particular search terms or one or more other content items used to filter content posted to the set of chat rooms.

4. The computer-implemented method of claim 1, further comprising: receiving, by the computer system from a client device, a third request to establish the meta-room;
in response to receiving the third request, performing establishing the meta-room.

5. The computer-implemented method of claim 1, wherein the first user interface includes one or more third elements for one or more chat rooms of the plurality of chat rooms, and wherein each of the one or more third elements is selectable to initiate display of an associated chat room.

6. The computer-implemented method of claim 5, wherein the first element for the meta-room has a different visible format than the one or more third elements for the one or more chat rooms.

7. The computer-implemented method of claim 1, wherein the third user interface for the chat room includes additional content not included in the second user interface for the meta-room.

8. The computer-implemented method of claim 1, further comprising: establishing, by the computer system and for the account, a second meta-room that aggregates content posted to a second set of chat rooms of the plurality of chat rooms;
wherein the first user interface includes a third element for the second meta-room, wherein the third element for the second meta-room is selectable to initiate display of the second meta-room;
receiving, by the computer system, a third request that corresponds to a selection of the third element;
in response to receiving the third request, providing instructions to display a fourth user interface for the second meta-room, wherein the fourth user interface includes one or more fourth elements corresponding to aggregated content from the second set of chat rooms, wherein each of the one or more fourth elements is selectable to initiate display of a chat room, of the second set of chat rooms, associated with corresponding aggregated content, and wherein the aggregated content of the second set of chat rooms is different from the aggregated content of the first-named set of chat rooms.

9. A computer-implemented method comprising:
executing, by a computer system, instructions to implement a message management program that supports interaction by an account with a plurality of chat rooms;
receiving, by the computer system, a first command to define a meta-room that aggregates content from a set of chat rooms of the plurality of chat rooms, the set of chat rooms including at least a first chat room and a second chat room;
in response to receiving the first command, providing instructions to display a first user interface, wherein a displayed first user interface includes an input panel configured to receive information to identify the set of chat rooms;
in response to receiving, via the input panel, information to identify the set of chat rooms, defining the meta-room to selectively include new content from the set of chat rooms;
providing, by the computer system, instructions to display a second user interface, wherein a displayed second user interface includes a first element for the meta-room, and wherein the first element is selectable to initiate display of the meta-room;
receiving, by the computer system, a second command that corresponds to a selection of the first element;

in response to receiving the second command, providing instructions to display a third user interface for the meta-room, wherein a displayed third user interface includes a plurality of second elements comprising new content posted to at least the first chat room and the second chat room; and
receiving a third command to filter the new content from the set of chat rooms;
wherein defining the meta-room includes defining, in response to receiving the third command, the meta-room to selectively include new and filtered content from the set of chat rooms; and
wherein the displayed third user interface includes the plurality of second elements corresponding to the new and filtered content posted to at least the first chat room and the second chat room.

10. The computer-implemented method of claim 9, wherein the third command specifies at least one of one or more particular search terms or one or more other content items used to filter the new content from the set of chat rooms.

11. The computer-implemented method of claim 9, wherein the input panel is configured to receiving information including one or more search terms used to identify the set of chat rooms, and wherein the input panel is configured to receive information to name the meta-room.

12. The computer-implemented method of claim 9, wherein the first command is received from a client device, and wherein the computer system sends, to the client device, the instructions to display the first user interface, the second user interface, and the third user interface.

13. The computer-implemented method of claim 9, wherein the second user interface includes one or more third elements for one or more chat rooms of the plurality of chat rooms, and wherein each of the one or more third elements is selectable to initiate display of an associated chat room.

14. The computer-implemented method of claim 13, wherein the first element for the meta-room has a different visible format than the one or more third elements for the one or more chat rooms.

15. The computer-implemented method of claim 9, further comprising:
receiving, by the computer system, a third command that corresponds to a selection of a given second element of the plurality of second elements;
in response to receiving the third command, providing instructions to display a fourth user interface for a chat room corresponding to the given second element.

16. The computer-implemented method of claim 15, wherein the fourth user interface for the chat room includes additional content not included in the third user interface for the meta-room.

17. The computer-implemented method of claim 9, further comprising: defining, by the computer system, a second meta-room to selectively include new content from a second set of chat rooms of the plurality of chat rooms;
wherein the second user interface further comprises a third element for the second meta-room, wherein the third element for the second meta-room is selectable to initiate display of the second meta-room;
receiving, by the computer system, a third command that corresponds to a selection of the third element for the second meta-room;
in response to receiving the third command, providing instructions to display a fourth user interface for the second meta-room, wherein the fourth user interface includes one or more third elements corresponding to the new content from the second set of chat rooms, wherein each of the one or more third elements is selectable to initiate display of a chat room, of the second set of chat rooms, associated with corresponding content, and wherein the new content from the second set of chat rooms is different from the new content from the first-named set of chat rooms.

18. One or more computer-readable non-transitory storage media storing sequences of computer-executable instructions which when executed by at least one processor cause the at least one processor to perform:

implementing a collaborative information management program that supports interaction by an account with a plurality of chat rooms;

receiving a first command to define a meta-room that aggregates content from a set of chat rooms of the plurality of chat rooms, the set of chat rooms including at least a first chat room and a second chat room;

in response to receiving the first command, providing instructions to display a first user interface, wherein a displayed first user interface includes an input panel configured to receive information to identify the set of chat rooms;

in response to receiving, via the input panel, information to identify the set of chat rooms, defining the meta-room to selectively include new content from the set of chat rooms;

providing instructions to display a second user interface, wherein a displayed second user interface includes a first element for the meta-room, and wherein the first element is selectable to initiate display of the meta-room;

receiving a second command that corresponds to a selection of the first element;

in response to receiving the second command, providing instructions to display a third user interface for the meta-room, wherein a displayed third user interface includes a plurality of second elements comprising new content posted to at least the first chat room and the second chat room; and receiving a filtering command to filter content posted to the plurality of chat rooms, wherein the meta-room filters the new content based on the filtering command to produce filtered content, which includes the plurality of second elements, and wherein each of the plurality of second elements is selectable to initiate display of a chat room, of the set of chat rooms, corresponding to respective new content;

receiving a third command that corresponds to a selection of a given second element of the plurality of second elements in the displayed second user interface;

in response to receiving the third command, providing instructions to display a fourth user interface for a chat room corresponding to the given second element of the one or more plurality of second elements.

* * * * *